(12) United States Patent
Ngampornsukswadi et al.

(10) Patent No.: US 10,931,533 B2
(45) Date of Patent: Feb. 23, 2021

(54) SYSTEM FOR NETWORK INCIDENT MANAGEMENT

(71) Applicant: ROYAL BANK OF CANADA, Montreal (CA)

(72) Inventors: Phume Ngampornsukswadi, Toronto (CA); Seyed Shayan Rafizadeh Amirsalami, Toronto (CA); Jessica Lynn Mallender, Toronto (CA); Matthew Edward Schembri, Toronto (CA); Olav Gerhardt Hanrath, Toronto (CA); Caren Suzanne Elson, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 72 days.

(21) Appl. No.: 15/679,086

(22) Filed: Aug. 16, 2017

(65) Prior Publication Data

US 2018/0054363 A1 Feb. 22, 2018

Related U.S. Application Data

(60) Provisional application No. 62/375,828, filed on Aug. 16, 2016.

(51) Int. Cl.
*G06F 15/173* (2006.01)
*H04L 12/24* (2006.01)
(Continued)

(52) U.S. Cl.
CPC .............. *H04L 41/12* (2013.01); *H04L 29/06* (2013.01); *H04L 41/064* (2013.01);
(Continued)

(58) Field of Classification Search
CPC ....... H04L 41/12; H04L 29/06; H04L 41/064; H04L 41/507; H04L 43/0852; H04L 67/1002; H04L 67/22; H04L 67/327
(Continued)

(56) References Cited

U.S. PATENT DOCUMENTS

6,735,178 B1 * 5/2004 Srivastava .............. H04L 12/44
370/252
7,743,128 B2 * 6/2010 Mullarkey .......... H04L 41/5009
709/223
(Continued)

*Primary Examiner* — Anthony Mejia
(74) *Attorney, Agent, or Firm* — Norton Rose Fulbright Canada LLP (57) ABSTRACT

A method for dynamic incident management for a computer infrastructure includes: receiving, via a network interface, end-user experience data associated with a plurality of end-user devices; storing the end-user experience data for a corresponding end-user device in an infrastructure database node corresponding to a location of the of the end-user device; upon determining that the end-user experience data for the corresponding end-user device indicates a latency issue at the end-user device, traversing the corresponding infrastructure database node to determine whether a threshold number of latency issues have occurred at the location within a defined time period; when the threshold number of latency issues have occurred, mapping the latency issues to a system performance alert received within a mapping time threshold as a potential root cause; and triggering the execution of response instructions based on the potential root cause.

19 Claims, 11 Drawing Sheets

(51) Int. Cl.
*H04L 12/26* (2006.01)
*H04L 29/08* (2006.01)
*H04L 29/06* (2006.01)

(52) U.S. Cl.
CPC ........ *H04L 41/507* (2013.01); *H04L 43/0852* (2013.01); *H04L 67/1002* (2013.01); *H04L 67/22* (2013.01); *H04L 67/327* (2013.01)

(58) Field of Classification Search
USPC ........................................................ 709/238
See application file for complete search history.

(56) References Cited

U.S. PATENT DOCUMENTS

| | | | | |
|---|---|---|---|---|
| 8,352,589 | B2 * | 1/2013 | Ridel | G06F 11/3495 709/224 |
| 9,372,776 | B2 * | 6/2016 | Diment | G06F 11/3419 |
| 9,799,206 | B1 * | 10/2017 | Wilson Van Horn | H04N 7/188 |
| 10,193,741 | B2 * | 1/2019 | Zafer | H04L 41/0631 |
| 2003/0033404 | A1 * | 2/2003 | Richardson | H04L 43/0864 709/224 |
| 2013/0024731 | A1 * | 1/2013 | Shochat | G06F 11/3612 714/38.1 |
| 2014/0308914 | A1 * | 10/2014 | Lee | H04W 4/90 455/404.1 |
| 2020/0034194 | A1 * | 1/2020 | Szczepanik | G06F 9/4881 |

* cited by examiner

Alert Details

| FIRST OCCURRENCE | R/P_CODE | DEVICE TYPE | TRENDING STATUS ▼ | TRENDING DEVICES |
|---|---|---|---|---|
| 2016-08-05 09:41:16 | BC_02 | Server | 1.00 | r(1), c(24), Server(6) |
| 2016-08-05 09:41:12 | BC_02 | Server | 1.00 | r(1), c(22), Server(7) |
| 2016-08-05 14:43:28 | BC_02 | Server | 1.00 | r(2), c(1), Server(9) |
| 2016-08-05 14:43:29 | BC_02 | Server | 1.00 | r(2), c(1), Server(9) |
| 2016-08-05 14:43:02 | BC_02 | Server | 1.00 | r(2), c(1), Server(9) |
| 2016-08-05 14:42:57 | BC_02 | Server | 1.00 | r(2), c(1), Server(9) |
| 2016-08-05 14:42:35 | BC_02 | Server | 1.00 | r(2), c(1), Server(9) |

SYSTEM FOR NETWORK INCIDENT MANAGEMENT

CROSS-REFERENCE TO RELATED APPLICATIONS

This application claims all benefit including priority to U.S. Provisional Patent Application 62/375,828, filed Aug. 16, 2016, and entitled "SYSTEM FOR NETWORK INCIDENT MANAGEMENT", which is hereby incorporated by reference in its entirety.

TECHNICAL FIELD

Embodiments of this disclosure relate to the field of networked computer infrastructure, and more particularly to systems, methods, devices, and computer-readable media for network incident management.

BACKGROUND

Computer systems for large organizations, such as financial institutions, are often spread across many geographic locations and may involve disparate devices and networks. In these situations, network incidents such as device or network outages or failures are often handled individually on a case-by-case basis.

SUMMARY

Embodiments of the present disclosure are directed to systems, methods, devices and computer-readable media which receive incident data and/or situation data, and based on this data, generate alerts to warn of potential impacts that may cause cascading problems or may otherwise affect other network components.

In one aspect, there is provided a method for dynamic incident management for a computer infrastructure including a plurality of electronic devices located across a plurality of infrastructure locations. The method includes: receiving, via a network interface, end-user experience data associated with a plurality of end-user devices; storing the end-user experience data for a corresponding end-user device in an infrastructure database node corresponding to a location of the of the end-user device; upon determining that the end-user experience data for the corresponding end-user device indicates a latency issue at the end-user device, traversing the corresponding infrastructure database node to determine whether a threshold number of latency issues have occurred at the location within a defined time period; when the threshold number of latency issues have occurred at the location within the defined time period, mapping the latency issues to a system performance alert received within a mapping time threshold as a potential root cause; and triggering the execution of response instructions based on the potential root cause.

In another aspect, there is provided a system for dynamic incident management for a computer infrastructure including a plurality of electronic devices located across a plurality of infrastructure locations, the system comprising at least one processor configured for: receiving, via a network interface, end-user experience data associated with a plurality of end-user devices; storing the end-user experience data for a corresponding end-user device in an infrastructure database node corresponding to a location of the of the end-user device; upon determining that the end-user experience data for the corresponding end-user device indicates a latency issue at the end-user device, traversing the corresponding infrastructure database node to determine whether a threshold number of latency issues have occurred at the location within a defined time period; when the threshold number of latency issues have occurred at the location within the defined time period, mapping the latency issues to a system performance alert received within a mapping time threshold as a potential root cause; and triggering the execution of response instructions based on the potential root cause.

In another aspect, there is provided a non-transitory computer-readable medium or media having stored thereon instructions which, when executed by at least one processor, configure the at least one processor for: receiving, via a network interface, end-user experience data associated with a plurality of end-user devices; storing the end-user experience data for a corresponding end-user device in an infrastructure database node corresponding to a location of the of the end-user device; upon determining that the end-user experience data for the corresponding end-user device indicates a latency issue at the end-user device, traversing the corresponding infrastructure database node to determine whether a threshold number of latency issues have occurred at the location within a defined time period; when the threshold number of latency issues have occurred at the location within the defined time period, mapping the latency issues to a system performance alert received within a mapping time threshold as a potential root cause; and triggering the execution of response instructions based on the potential root cause.

DESCRIPTION OF THE DRAWINGS

Reference is now made to the accompanying drawings, in which.

DETAILED DESCRIPTION

In some instances, based on the received incident and/or situation data, embodiments described herein may proactively adjust systems and devices to reduce or avoid additional or larger problems from occurring.

In some situations, one or more aspects of the systems/methods described herein can use end user experience and infrastructure and application monitoring data to perform root cause analysis and identify widespread problems quickly (e.g. in real or near-real time, as they occur). In some embodiments, the system may use this data to predict when technology issues will occur and to proactively send automated scripts or notifications to remediate the issue in advance or as quickly as possible.

In some instances, based on the received incident and/or situation data, embodiments described herein may reduce the amount of time between the detection of an incident or potential incident and the adjustment of network/device operations to correct, recover, avoid, or otherwise reduce the impact of such potential or actual incident.

Figure 1:
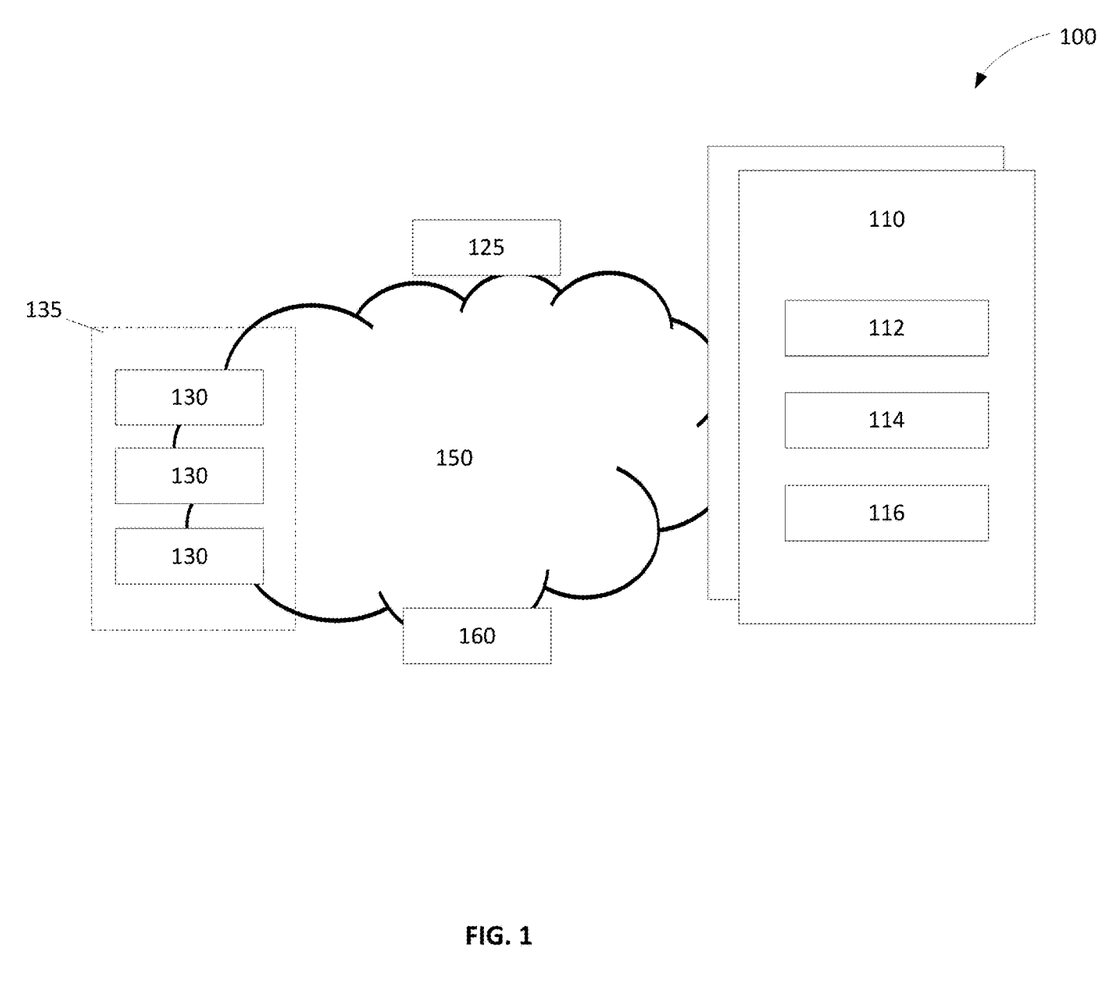
FIGS. 1-3 show aspects of example systems in accordance with various aspects of the invention.

FIG. 1 shows aspects of an example system 100 to which aspects of the present disclosure may be applied. The system 100 includes multiple devices 110 which are part of a computer infrastructure such as an information technology infrastructure for a large organization (e.g. a financial institution). In some embodiments, the devices 110 can include end-user devices, network devices, servers, and any other electronic device which may suffer from performance issues or other incidents. In some embodiments, the devices 110 can include one or more devices configured to collect, generate and/or monitor end-user experience data and/or system performance data; to manage and/or respond to detected problems/incidents/wide-scale issues; and/or to perform any or any part of the methods described herein.

In some embodiments, the devices 110 can be at different physical and/or logical locations. For example, the devices 110 can be located at a particular location of the organization (e.g. a bank branch/transit), and/or at a particular network location (e.g. IP subnet).

In some examples, a device 110 may be a computational device such as a computer, server, tablet or mobile device, or other system, device or any combination thereof suitable for accomplishing the purposes described herein. In some examples, the device 110 can include one or more processor(s) 112, memories 114, and/or one or more devices/interfaces 116 (e.g. network interfaces) necessary or desirable for input/output, display, communications, control and the like. The processor(s) 112 and/or other components of the device(s) 110 or system 100 may be configured to perform one or more aspects of the processes described herein.

In some embodiments, the device(s) 110 may be configured to receive or access data from one or more volatile or non-volatile memories 114, or external storage devices 125 directly coupled to a device 110 or accessible via one or more wired and/or wireless network(s)/communication link(s) 150. In external storage device(s) 125 can be a network storage device or may be part of or connected to a server or other device.

In some embodiments, device(s) 110 may be configured to generate, monitor and/or receive end-user experience data associated with one or more end-user devices. End-user experience data can include any data that can be observed or measured by the system to provide information about how an end user is experiencing the system.

In some embodiments, end-user experience data can include identifiers and performance data associated with an application running on an end-user device, whether an application is running in the foreground or background, identifiers and performance data associated with a particular activity in an application that an end-user is conducting or attempting to conduct, device resource utilization, user interactions (e.g. cursor movements, inputs, user-interface interactions, etc.), device health and performance, and any other factor which may provide information regarding an end-user's experience.

In some embodiments, the end-user experience data can include data which can indicate latency issue(s). For example, in some embodiments, the end-user experience data can include wait times, time periods between actions, network latencies, activity/application completion times, crashes, hangs, errors, connectivity problems, and the like.

In some embodiments, processor(s) on an end-user device are configured to run one or more applications or processes which track/monitor end-user experience data. In some embodiments, end-user experience data can be collected/monitored using Aternity™.

In some embodiments, end-user data can include or can be used to identify one or more latency issues. In some embodiments, a latency issue can be associated with a particular component of the system or a device such as a hardware component or device resource; an application, activity or sub-activity being performed/utilized by an end user; and/or a corresponding location in the system.

In some examples, the device(s) 110 may be configured to receive or access data from network devices 130. These or other devices may be configured for collecting, measuring or otherwise monitoring system performance data. The network devices 130 can include computers, servers, user terminals, mobile phones/tablets/computing devices, phones (e.g. VoIP), routers, switches, storage devices, mainframes, automated teller machines (ATMs), and/or any other device.

In some embodiments, system performance data can include network status/performance data and/or server status/performance data. In some embodiments, system performance data can include data indicating how various infrastructure components (e.g. servers, network, routers, switches) and application are performing.

In some embodiments, network performance data can include computer failures, network connection statuses, network traffic statistics, and the like. In some embodiments, server performance data can include data regarding the performance of a server when providing application services and/or data. For example server performance data can include latencies, execution times, data access times, crashes, errors, hangs, connectivity problems, resource utilization/availability, and the like.

In some embodiments, system performance data can include data from incident reports. For example, incident reports may include reports regarding technical issues such as problems printing, database access problems or errors, server access problems (e.g. email or file servers), phone issues, and the like. In some embodiments, incident report data may be received from user devices such as a computer, mobile device or user terminal. In some embodiments, incident report data may be entered at a different location than where the incident is occurred (e.g. a tech support user may enter data reported by a user whose computer does not work, etc.).

In some embodiments, system performance data may include inventory data such as available cash, foreign currencies, printer paper/toner/ink, envelopes, etc. which may be available at a particular ATM, workstation, or other location.

In some embodiments, system performance data may be obtained from sensor data, log data, and/or any other monitoring data. In some embodiments, data may be obtained in real or near real-time.

In some embodiments, system performance data can be obtained using Moog™.

In some examples, the device(s) 110, 130 can be configured to communicate end-user experience data and/or system performance data to the device(s) 110 and/or storage device(s) 125 via one or more networks/links 150 or otherwise. In some examples, the device(s) 110 may be configured to generate and/or transmit signals or instructions to one or more network device(s) 130 to apply desired operational inputs/conditions, and/or to one or more client devices 160 to convey alerts and/or information.

In some embodiments, end-user experience data and system performance data can include a device identifier, location information (which may be provided explicitly or may be obtained by cross-referencing a device identifier in a database), and/or timestamps of when an event occurred or when a value was observed/measured.

In some embodiments, end-user experience data and system performance data can identify issues classified as normal, minor or major based on one or more threshold criteria such as how long a delay is, or whether the activity hangs versus causing the entire program or operating system to crash.

In some embodiments, one or more processors in the system are configured to associate end-user experience data and system performance data with one or more locations or groups. For example, a group of devices 110, 130 may be associated with a particular branch location identified with a location identifier. In some embodiments, the location identifier can be associated with a physical, logical or mailing address, hours of operation, type of operation and/or other location-specific operational data.

In some examples, a client device 160 may connect to or otherwise communicate with the device(s) 110 to gain access to the data and/or to instruct or request that the device(s) 110 perform some or all of the aspects described herein.

In some examples, the devices 110, 130 may be logically and/or physically associated with one or more locations or network groups 135. For example, a device may be associated with a bank branch, a data hub for a particular region, a country, a city, a province/state, a region, etc.

Figure 2:
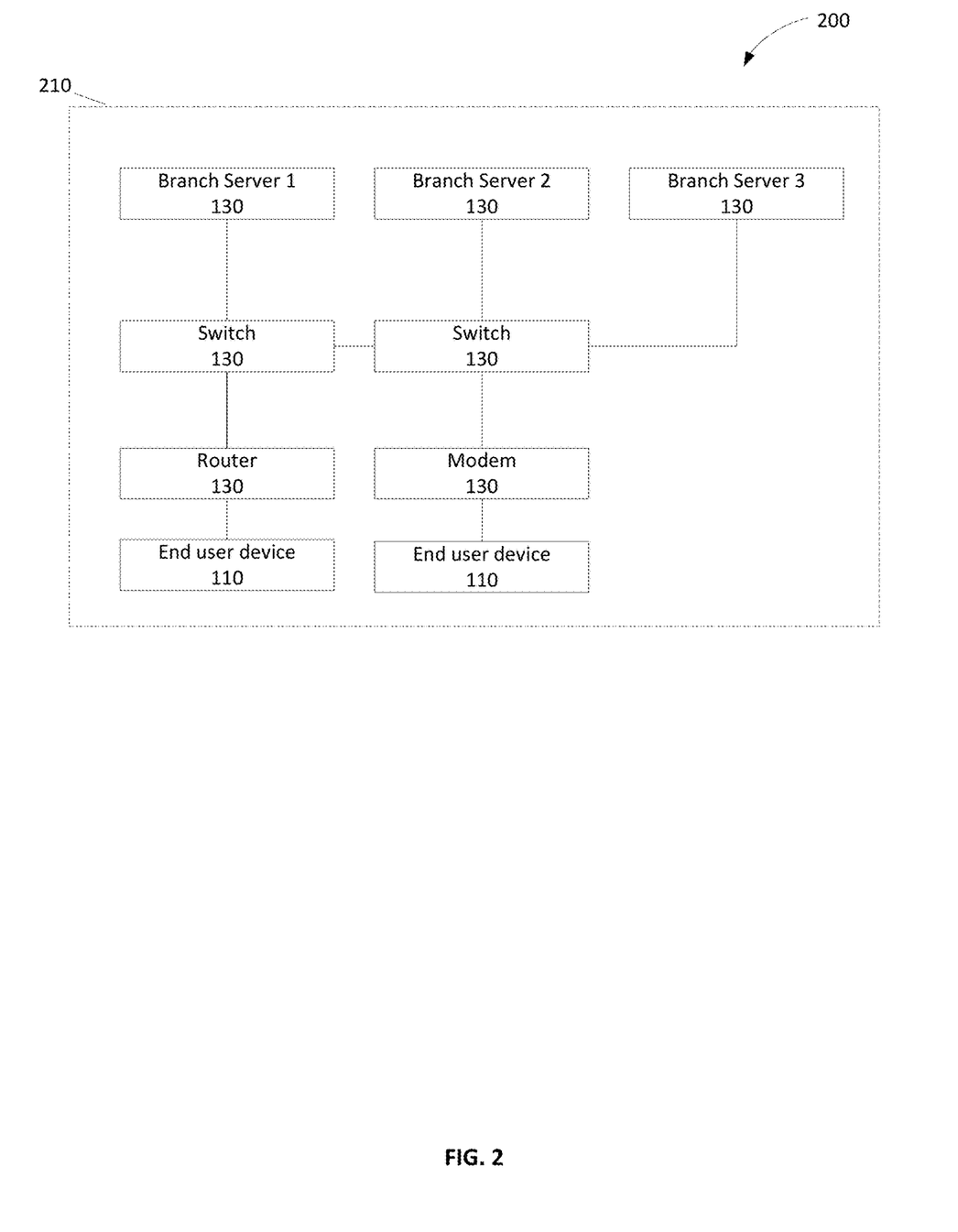

For example, FIG. 2 shows aspects of an example system 200 of devices 110, 130 which are logically and/or physically associated with a group 210 representing a particular bank branch. In an example scenario, an end user device may be operated by a representative of a financial institution. The end user device can be running one or more web or device-based applications such as a client portfolio management application. Some activities within this application can include checking portfolio positions, account lookups, creating and submitting transaction requests, searching, launching the application, etc. Another example application is a customer relationship management application which records and manages client relationship information. Some activities for this application can include adding tasks to a calendar, contact database searching, adding/editing journals/notes, launching the application, etc.

Some of the above example activities or any other activity may occasionally suffer from delays caused by one or more components at the end user device, delays caused by one or more components at the server which processes requests for some of these activities, or delays caused by network components such as routers, switches, network connections, or other devices on the network.

Figure 3:
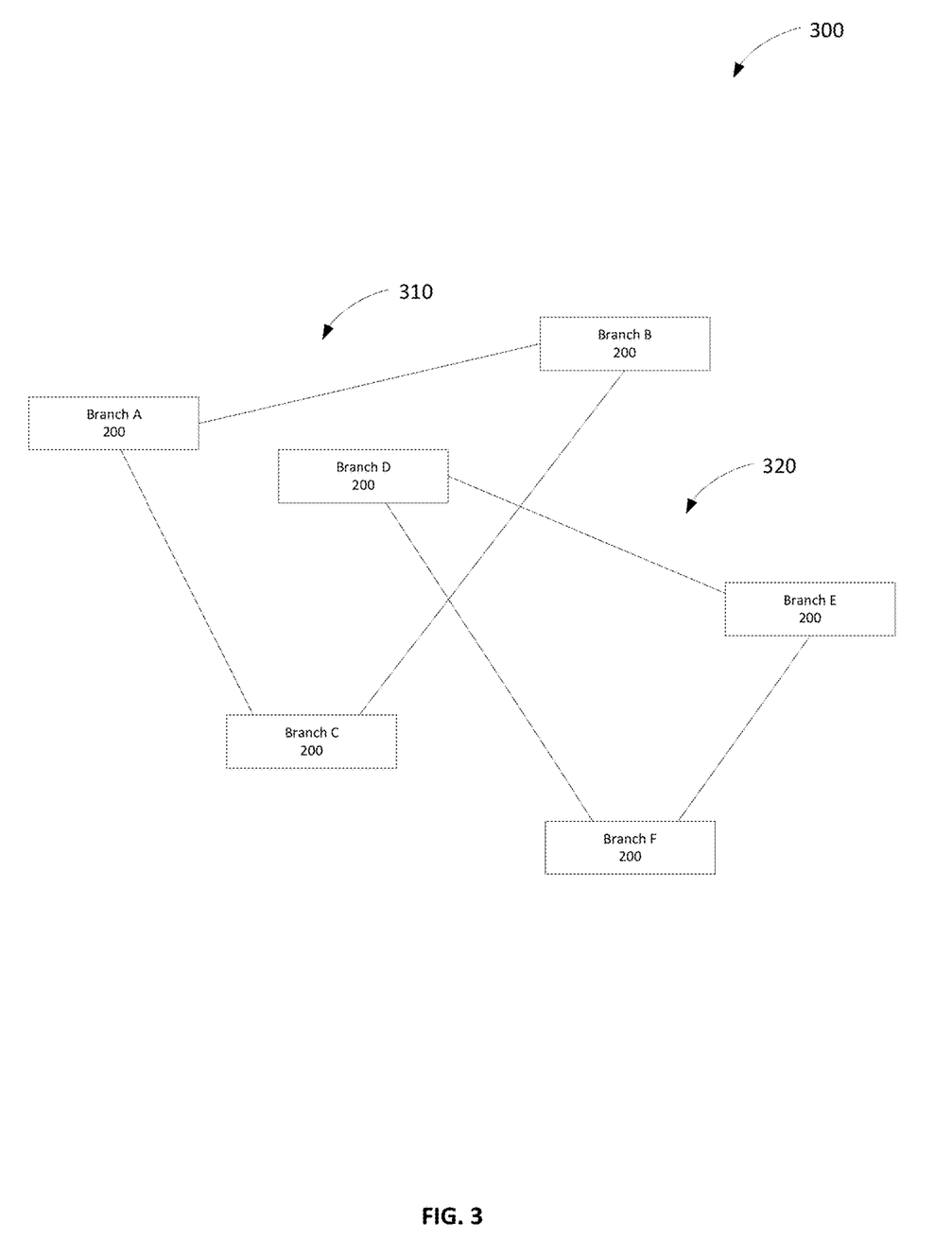

FIG. 3 shows aspects of an example system 300 of devices/systems 110/130/200 which are logically associated with two different groups 310, 320 based on (logical) network topologies.

Figure 4:
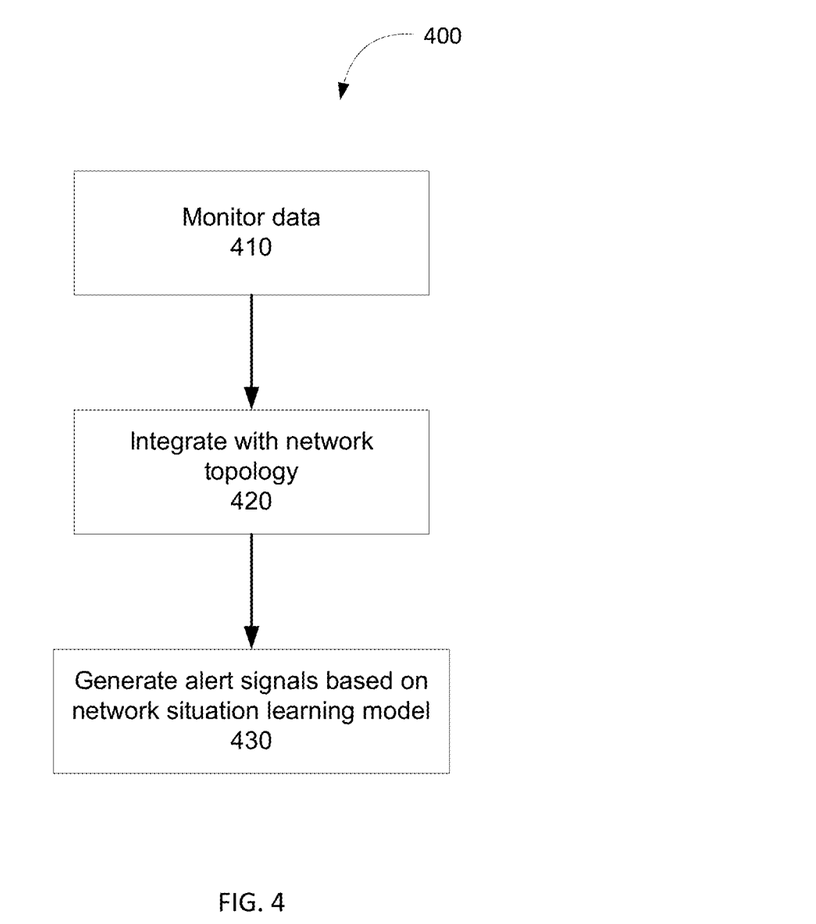
FIG. 4 shows a flowchart illustrating aspects of an example method in accordance with various aspects of the invention.

FIG. 4 shows aspects of an example method 400 of managing network incidents. At 410, one or more processors in the system monitor network status data.

In some embodiments, the method includes processing the data. This can include cleaning, merging, associating, manipulating, formatting, or otherwise adjusting and/or integrating data from different data sources.

At 420, one or more processors apply geo-coordinate and/or network topology data to generate data for a particular location/region and/or other groupings. In some embodiments, the processors can provide a graphical user interface for conveying such information.

Figure 5:
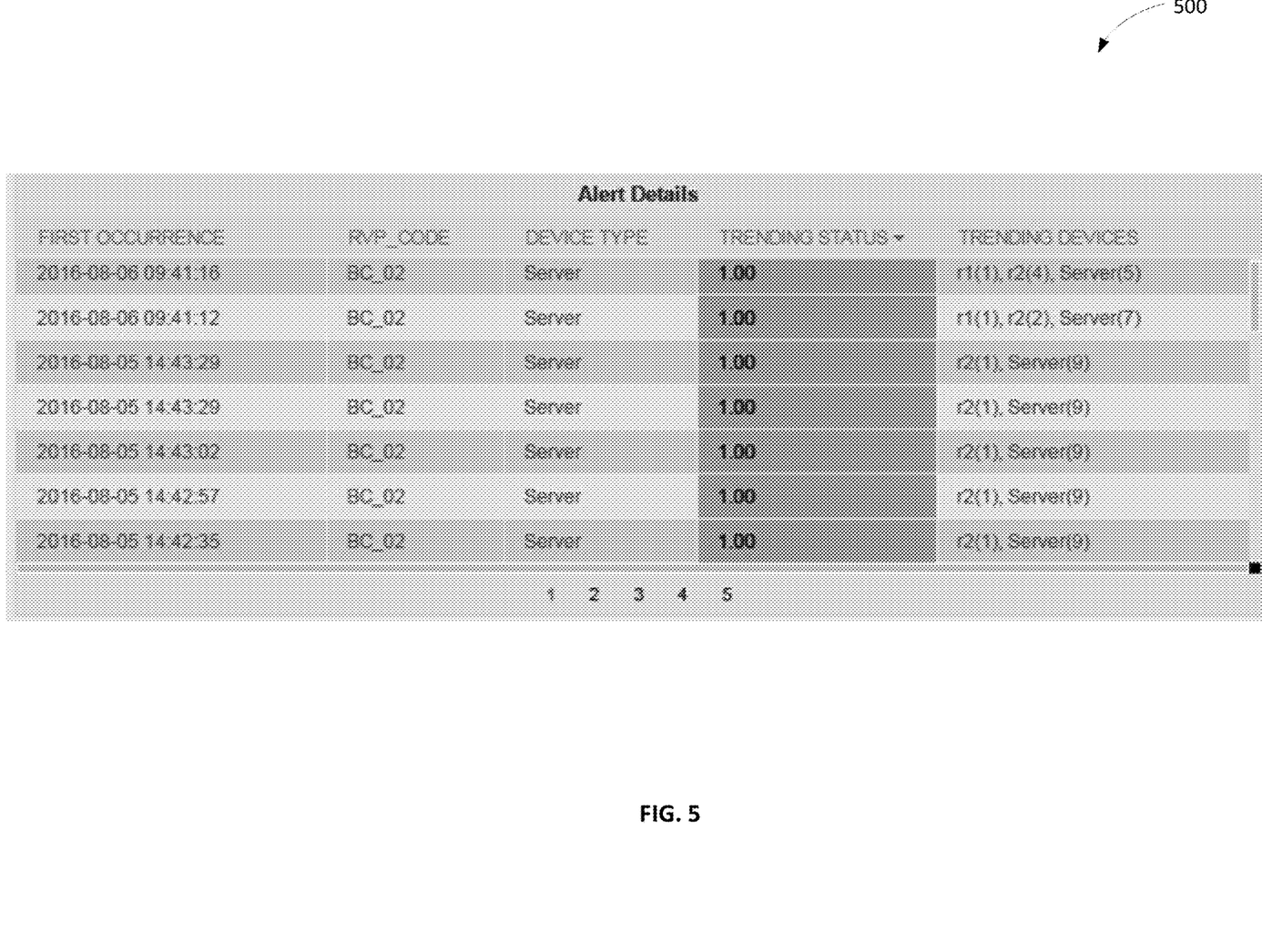
FIGS. 5-8 shows aspects of example interfaces in accordance with various aspects of the invention.

At 430, one or more processors generate alert signals based on a network situation model or intelligence engine and the network status data. In some embodiments, the processors can generate alerts based on potential trend values, trending devices, devices types, occurrence times, locations, groupings, etc. FIG. 5 shows aspects of an example interface 500 showing network status data.

In some embodiments, one or more processors can generate alert signals by displaying or generating signals for displaying network incidents on a group (e.g. regional, or topological) basis.

Figure 6:
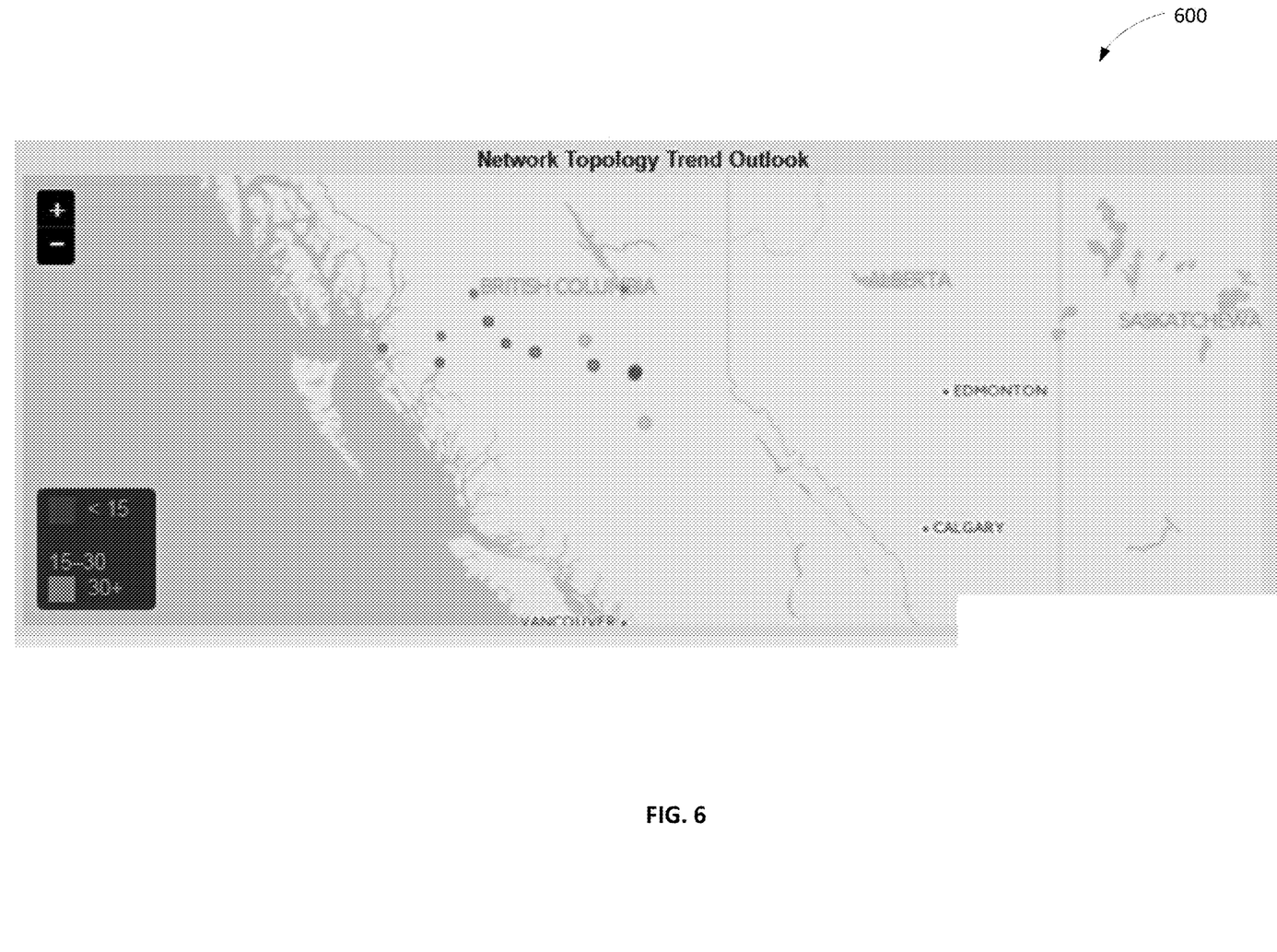

FIG. 6 shows aspects of an example interface 600 showing network status data on a topological basis.

Figure 7:
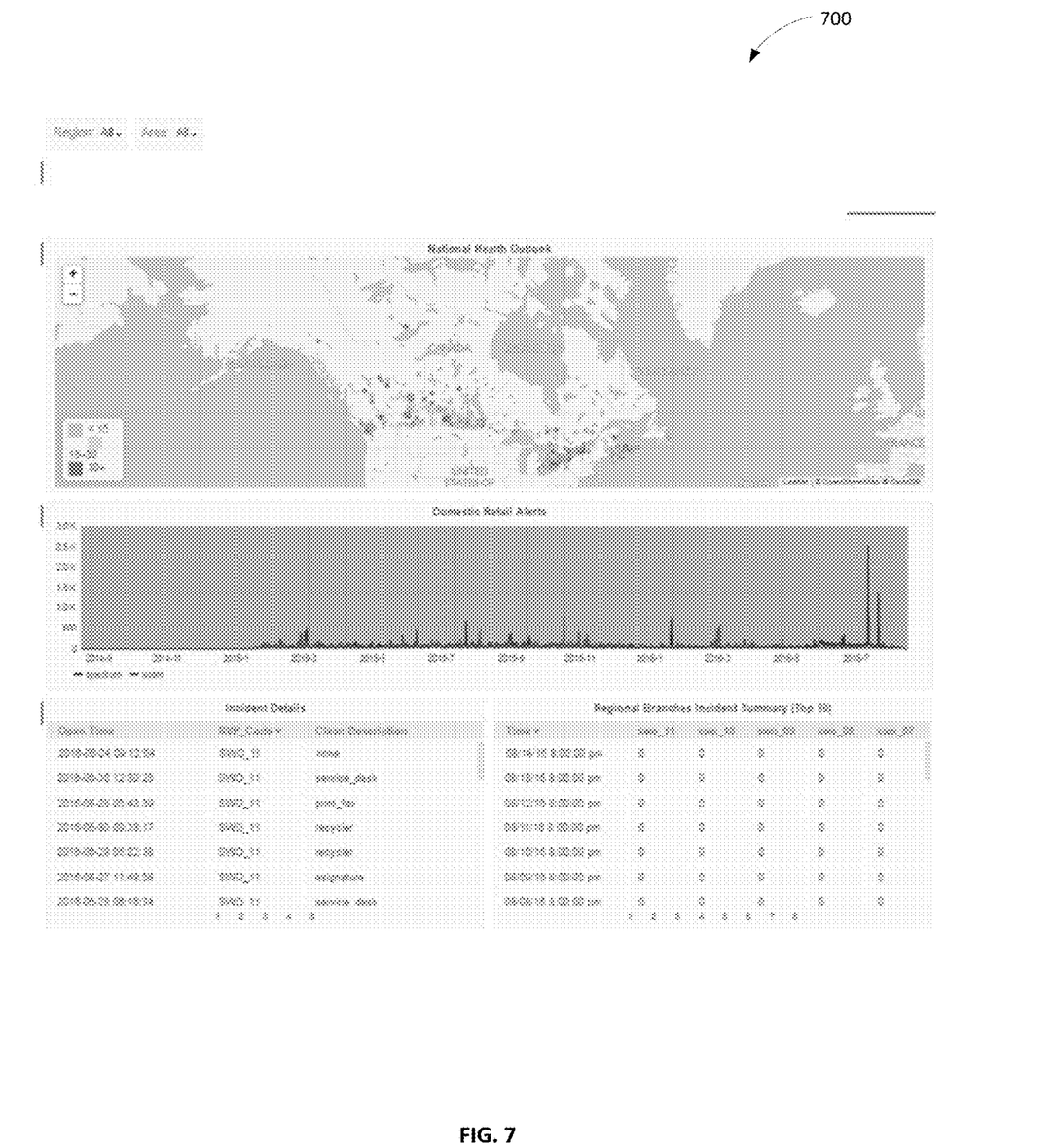
Figure 8:
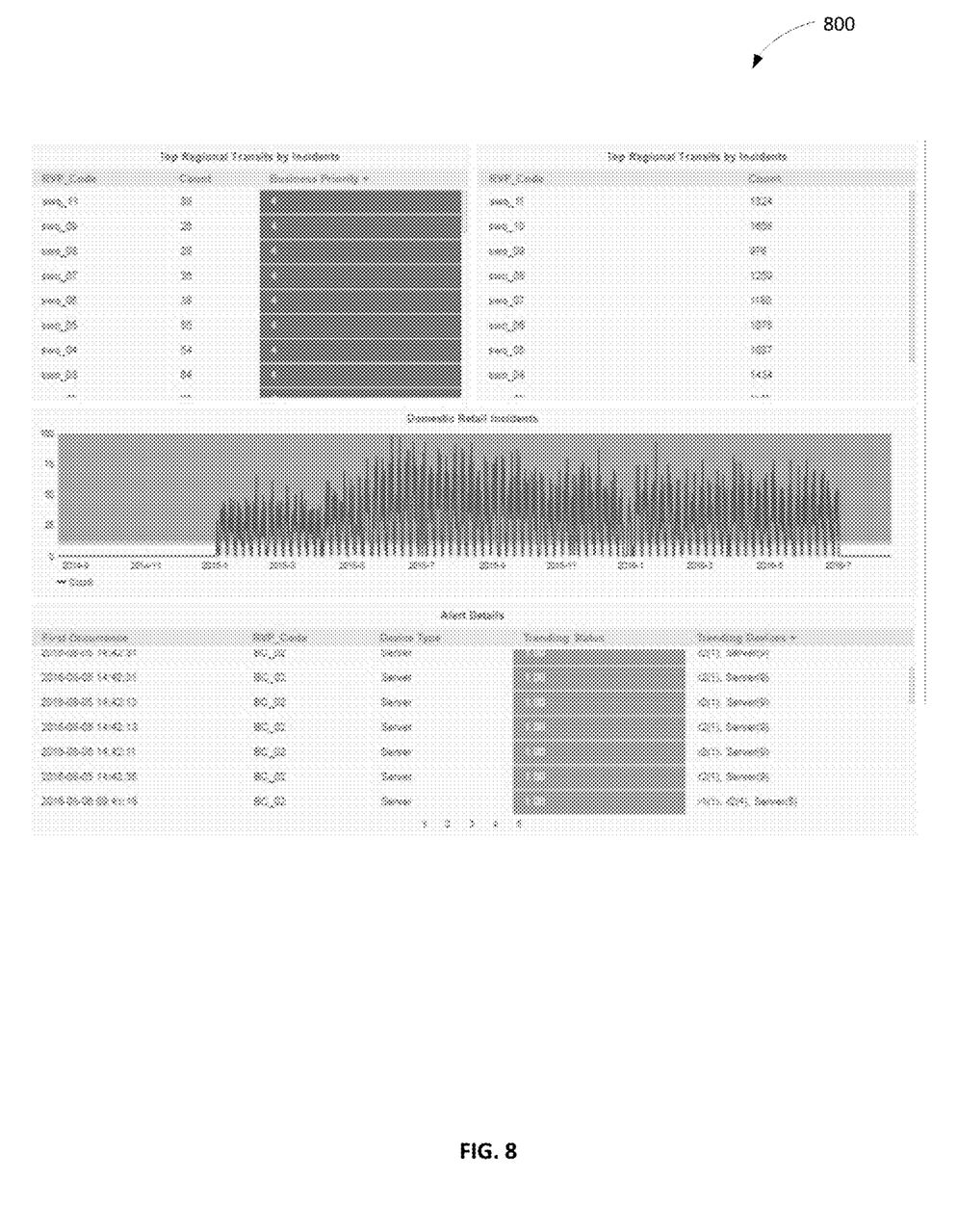

FIGS. 7 and 8 show aspects of example interfaces 700, 800 showing different forms network status data on a group basis.

The particular presentation and arrangement of this data may, in some instances, be useful to visualize and potential identify larger problems or predicted problems.

In some embodiments, the processors can provide an interface for viewing data from all or multiple locations/ systems/groupings for an organization in a single interface. For example, the interface may show a bank's computer outages/incidents across one or more branches. In some instances, this may be an improvement over systems where obtaining data about branch activities was a difficult process that involved manually accessing and comparing data from multiple sources.

As illustrated by example in the figures, in some embodiments, one or more interfaces are configured to show all of the branches in a given region (national, region, city, etc.) on a map, and indicate unresolved reported incidents at each bank in the region by a coloured icon. Other tables in the app show the reported incidents, which can be ranked in various ways. Each branch or incident can be clicked on in order to view more details about the branch's incidents or about the particular incident.

In some embodiments, interfaces can be provided to a remote client machine for remote monitoring and/or notifications. In some embodiments, interfaces with limited permissions may be provided to a customer to provide information as to the status of a particular branch, location (e.g. teller or foreign currency availability), or network device (e.g. ATM).

Figure 9:
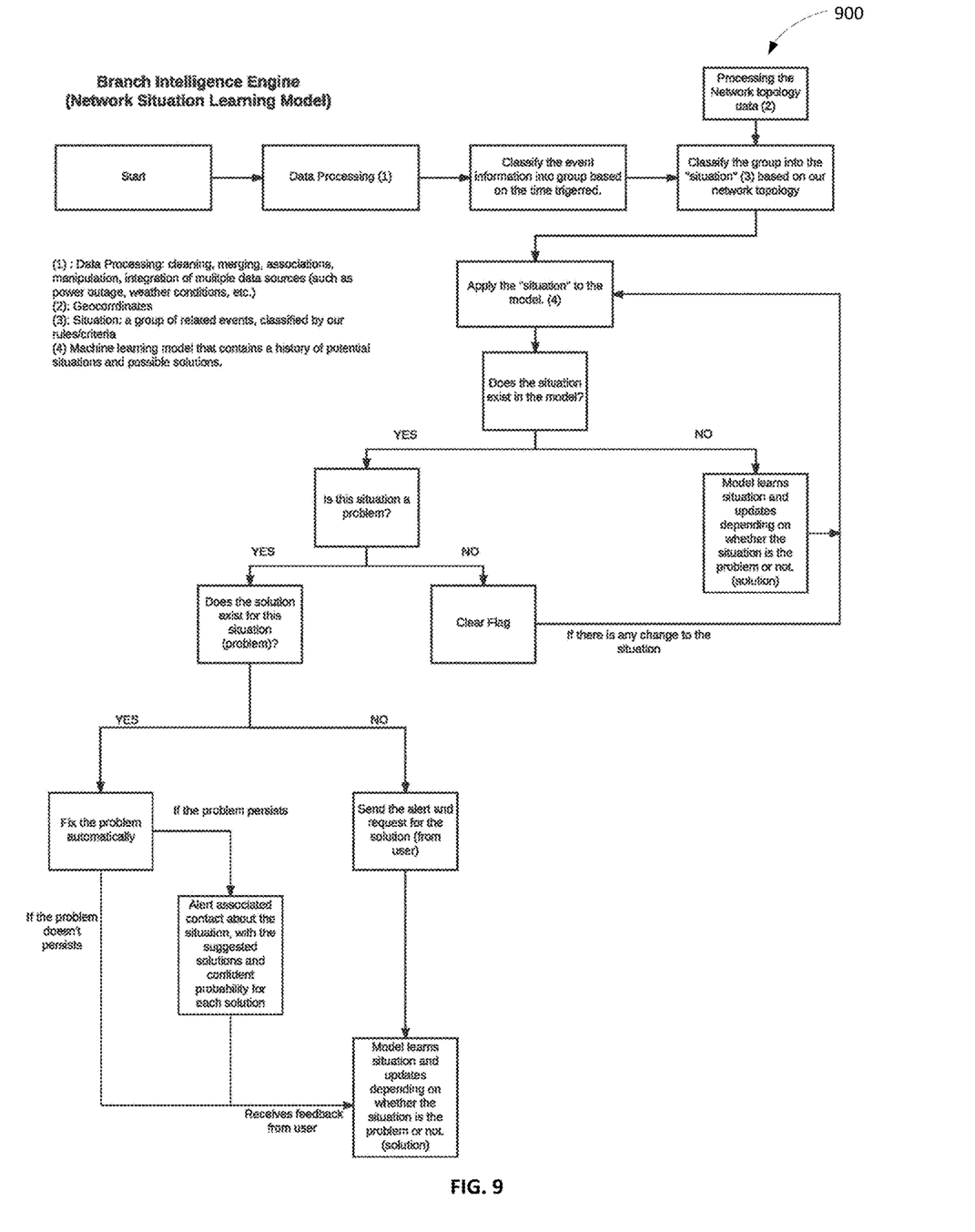
FIGS. 9-10, show flowcharts illustrating aspects of example methods in accordance with various aspects of the invention.

FIG. 9 shows aspects of an example method 900. As described herein or otherwise, the method includes processing network status data, and applying the network status data to one or more dynamic models representing different groups, network topologies, geographic locations/coordinates, and/or situations. In some embodiments, the situations represent groups of related events which have historically been associated with a particular situation or event (e.g. router failure, power outage, low teller station/ATM inventory/supplies, etc.).

Upon detection of a particular situation, the system is configured to trigger an alert signal based on one or more situation models. In some instances, the alert signal is a communication signal to communicate the situation and/or to request/instruct a user (e.g. technician) to perform one or more actions in an attempt to solve the situation.

In some instances, the alert signal is a signal to a network device instructing the network device to perform one or more actions in an attempt to solve the situation (e.g. reboot a server or network device if this is known to solve a particular situation).

In some embodiments, the models are based on past situations and actions which were taken along with an indication of whether they were successful.

In some embodiments, a model may include network status data associated with a situation, and previously effective solutions.

In some embodiments, the system is configured to update its models when a new action is taken, and/or when an action is successful or unsuccessful.

In some embodiments, the system is configured to extrapolate and/or predict if errors would have effect on other aspects of the network not currently showing incident data, and to generate alert signals to take the modelled preventative action as required.

In some embodiments, the system is configured to perform automatic analysis of reported incidents at one or more branches, based on their network structures, to determine whether those incidents are indicative of a wider issue which is affecting or could affect other branches on the bank's networks. In some instance, the system could then automatically generate alerts to warn of determined potential impacts.

In some embodiments, the system automates certain actions based on its analysis. For example, if there is a known action to be taken upon the occurrence of a particular incident, the portal, upon identifying that type of incident, could send commands to other devices on the bank's network to take corrective action (e.g. sending a server a command to reboot, possibly during a particular time window), or instructing routers to change their network routing.

In accordance with aspects of the embodiments described above or otherwise, FIG. 10 shows aspects of an example method 1000 for dynamic incident management for a computer infrastructure including electronic devices at multiple locations in the infrastructure. In some embodiments, a computer infrastructure can include any system or group of devices such as a system or group of devices utilized in the IT infrastructure of a large organization.

Figure 10:
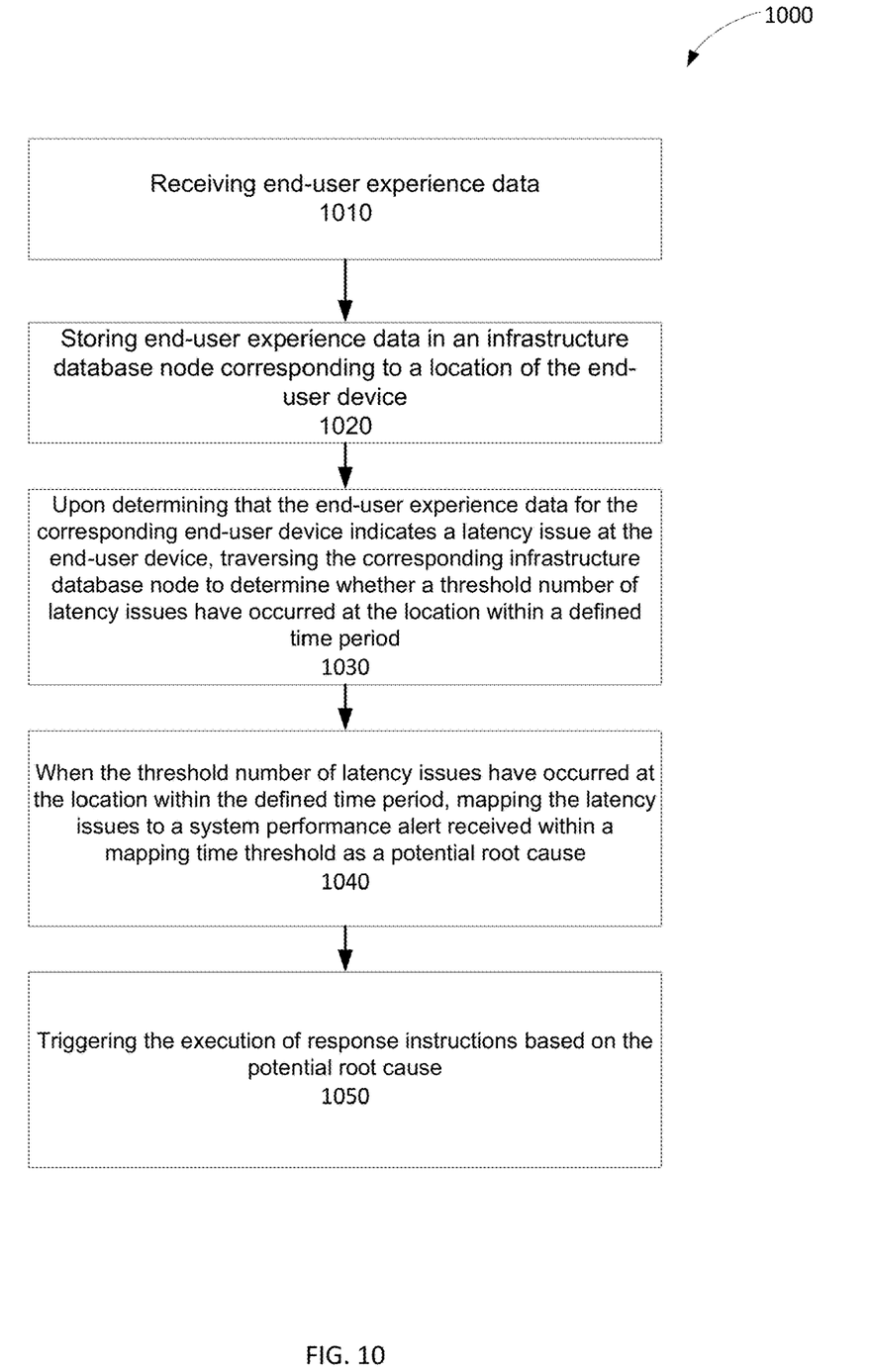

At 1010, one or more processors in the system receive end-user experience data associated with end-user devices. In some embodiments, the end-user experience data is received via a network interface. In some embodiments, the end-user experience data is received from application(s) or service(s) operating at the end-user devices. In some embodiments, the end-user experience data is received continuously, periodically, or in a relatively consistent and/or proximate time to when the data is obtained, measured and/or filtered.

In some embodiments, one or more processors at the end-user device or elsewhere in the system may filter the end-user experience data to only include data relating to abnormal functioning. In some embodiments, the filtering may be done by comparing delays and/or events with time and/or severity criteria which define when a delay or an event is outside normal or expected operating ranges.

At 1020, the end-user experience data for a particular end-user device is stored in an infrastructure database node corresponding to a location of the end-user device. In some embodiments, the end-user experience data in the database node is received, grouped and/or stored in conjunction with an application identifier which identifies an application to which the data pertains, and/or an application action identifier which identifies a particular action within an application to which the data pertains. In some embodiments, the end-user experience data is stored with a timestamp to indicate when the data was measured, collected or received.

In some embodiments, the processor(s) monitor system performance data. The system performance data can include network performance data (which can include network status data) and/or server performance data (which can include server status data). In some embodiments, the processor(s) trigger the generation of a performance alert when the system performance data satisfies at least one condition indicative of a system performance issue. For example, a performance alert may be generated when a network connection has a latency value exceeding a threshold value, when a server has a request response time that exceeds a threshold value, when a crash or error message is received, when a server fails to respond to a request successfully, etc.

In some embodiments, triggering a performance alert includes flagging or otherwise storing the system performance data to indicate that the data is abnormal or is operating outside normal operational ranges or conditions. In some embodiments, triggering a performance alert includes communicating an alert message to a device, account or destination associated with an administrator.

Figure 11:
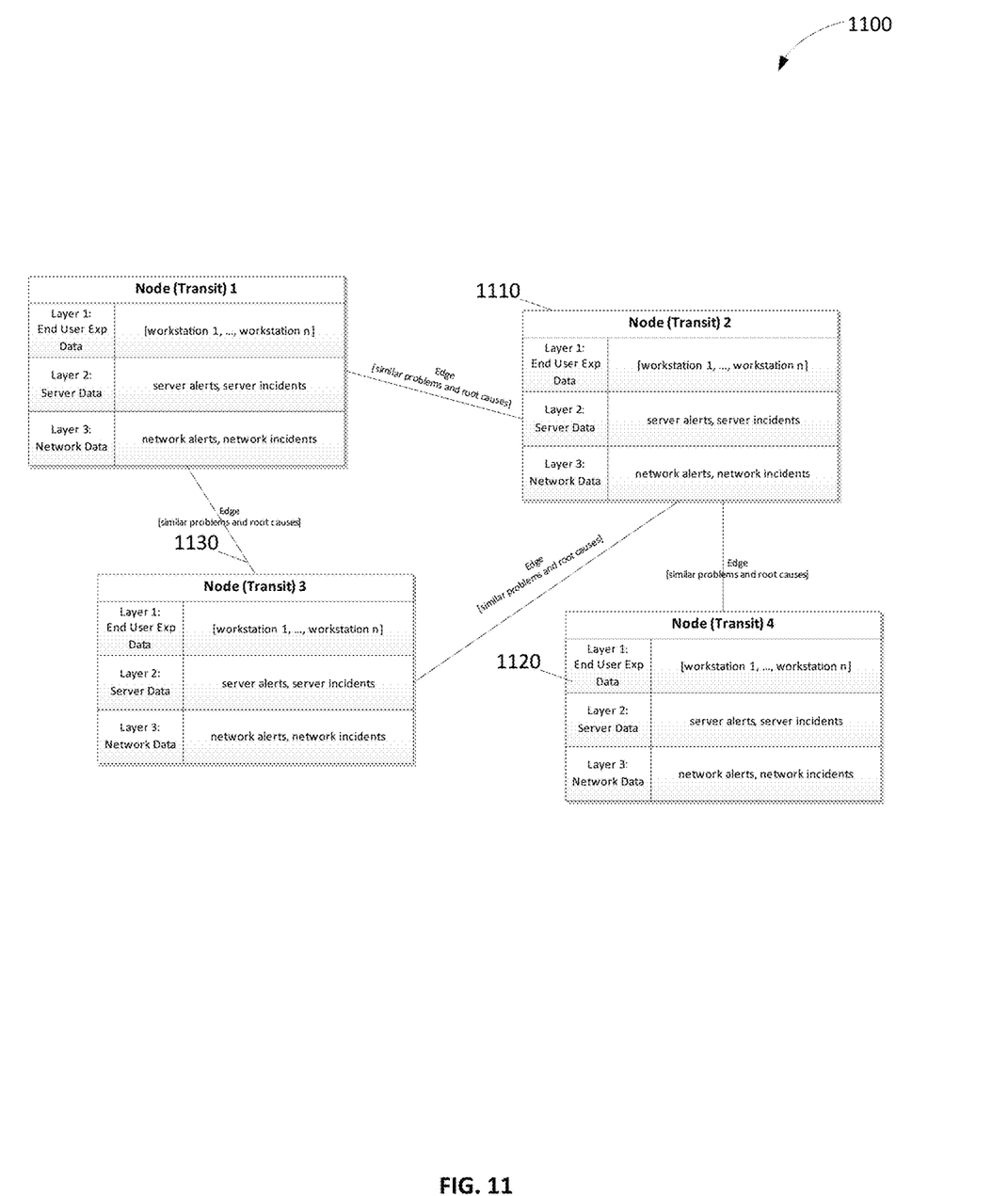
FIG. 11 shows an architecture illustrating aspects of an example graph database in accordance with various aspects of the invention.

As illustrated in FIG. 11, in some embodiments, data is stored in infrastructure database 1100 nodes 1110 in layers. For example, end-user experience data can be stored in a first layer 1120 and system performance data can be stored in a second layer. Different layers can be different arrays or database structures, or can be in the same database structure with different layer fields. In some embodiments, network performance data and server performance data can be further separated and stored in separate layers.

Returning to FIG. 10, at 1030, the processors determine whether the end-user experience data indicates a latency issue. In some embodiments, this determination can includes determining whether the data indicates that an event occurred which would slow down a user's activities (e.g. activity hanging, application crash), determining if an activity time exceeds a normal range, determining if delay between activities exceeds a normal range, etc. Upon determining the received data indicates a latency issue, the processors traverse the infrastructure database node corresponding to the location of the latency issue to determine whether a threshold number of these latency issues have occurred at the location within a defined time period. For example, a latency issue may be identified when it takes longer than 10 seconds to display a client record accessed from a server. The processors may determine whether this happens more than a threshold number of times (e.g. 3) within a defined period (e.g. 4 hours). In some embodiments, this determination can be made based on end-user experience data for the same activity, for the same application or some combination thereof. In some embodiments, the threshold number of times and the defined period may vary based on the activity, the application, the location, the time of day, or any other relevant factor. In some embodiments, this determination may be based on whether latency issues across a number of different activities and or applications meet the threshold values.

At 1040, when the processors determine that the number of latency issues have occurred within the defined time period, it may be indicative of a system problem. Accordingly, in some embodiments, the processors map the system problem to a system performance alert which was triggered or received within a mapping time threshold (e.g. 10 hours) as a potential root cause. In some embodiments, a potential root cause can be verified or otherwise compared with additional server information such as health information displayed from a Windows™ L1 API to provide an additional degree of certainty as to the potential root cause.

For example, multiple delays in accessing a client record within a short period of time may be indicative of a system problem which the processors may map to a latency problem at a network router. In this example, the processors may map the end-user latency issues to a system performance alert relating to the performance data of the network router.

Based on this potential root cause, at 1050, the processors can trigger the execution of response instructions. In some embodiments, triggering the execution of response instructions can include: generating instructions to clear a cache, rebooting a device (e.g. the router), restarting a service, execution of an automated script, and/or generation of an alert or notification to an administrator.

In some embodiments, when the processors map a subsequent set of latency issues to the same potential root cause, this may be indicative of a more widespread system problem. Based on this mapping of additional/subsequent issues to the potential root cause, the processors can be configured to execute additional, more involved or otherwise escalated response instructions to attempt to rectify the potential root cause.

With reference again to FIG. 11, in some embodiments, the processors are configured to monitor each layer of the infrastructure database node for a trigger condition as described in some of the examples above or otherwise, and triggering the execution of response instructions when the trigger condition for a single layer is satisfied. In some embodiments, response instructions may be executed only when the trigger conditions for multiple layers are satisfied.

In some embodiments, upon mapping one or more latency issues at a first location to a potential root cause, the processors are configured traverse the end-user experience data of a second infrastructure database node corresponding to a second location to determine whether a similar mapping of latency issues exists at the second location. Upon detecting such a similar mapping, the processors generate a graph database edge 1130 between the first infrastructure database node associated with the first location, and the second infrastructure database node associated with the second location.

In some embodiments, the processors generate a location group data structure to store or otherwise group together the first and second database nodes. In some embodiments, the location group data structure can include data relating to a shared or similar application or activity identifier, and a related potential root cause. When subsequent latency issues arise for the first or second locations, the processors can be configured to traverse this group data structure to enhance or speed up identification and/or mapping of potential root causes.

In some embodiments, when a latency issue and potential root cause is identified for a first location, based on the group data structure, response instructions can be automatically executed to proactively address a potential and/or not yet identified latency issue at the second location.

In some embodiments, groupings can be done between individual layers of different nodes, or may include multiple layers across different nodes.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A method for dynamic incident management for a computer infrastructure including a plurality of end-user devices electronic devices located across a plurality of infrastructure locations, the method comprising:

receiving, via a network interface, end-user experience data associated with the plurality of end-user devices, the end-user experience data collected at the respective end-user devices and including performance data associated with at least one application running on the respective end-user devices of the plurality of end-user devices;

storing the end-user experience data for a corresponding end-user device in a first layer of an infrastructure database node corresponding to a location of the of the end-user device, the infrastructure database node configured to store end-user experience data for the plurality of end-user devices corresponding to the location;

monitoring system performance data, the system performance data including at least one of: network performance data or server performance data;

storing the system performance data associated with the location in a second layer of the infrastructure database node;

upon determining that the end-user experience data for the corresponding end-user device indicates a latency issue at the end-user device, traversing the corresponding infrastructure database node to determine whether a threshold number of latency issues have occurred at the location within a defined time period;

when the threshold number of latency issues have occurred at the location within the defined time period, mapping the latency issues to a system performance alert received within a mapping time threshold as a potential root cause, the system performance alert generated when the system performance data satisfies at least one condition indicative of a system performance issue; and triggering the execution of response instructions based on the potential root cause.

2. The method of claim 1, comprising: receiving end-user experience data indicative of a latency issue associated with an application identifier or an application activity identifier.

3. The method of claim 1, comprising: when a second set of latency issues are mapped to the same potential root cause, triggering the execution of response instructions for responding to a potential widespread system problem.

4. The method of claim 1, comprising: storing network performance data in the second layer, and storing server performance data in a third layer of the infrastructure database node.

5. The method of claim 1, comprising: monitoring each layer of the infrastructure database node for a trigger condition; and triggering the execution of response instructions when the trigger condition for at least one layer is satisfied.

6. The method of claim 1, comprising: upon mapping the latency issues to the potential root cause, traversing the end-user experience data of a second infrastructure database node for a similar mapping of latency issues at a second location; and upon detecting the similar mapping, generating a graph database edge between the infrastructure database node and the second infrastructure database node.

7. The method of claim 6, comprising: generating a location group data structure for the infrastructure database nodes connected by graph database edges; the location group data structure including:

an application identifier or an application activity identifier, and a related potential root cause.

8. The method of claim 6, comprising: subsequent to the generation of the location group data structure, upon triggering the execution of response instructions based on the potential root cause of received end-user experience data or system performance data for a first connected infrastructure database node identified in the location group data structure, triggering the execution of response instructions for a second connected infrastructure database node identified in the location group data structure.

9. The method of claim 1 wherein the response instructions cause at least one of: generation of an alert or notification, clearing a cache, rebooting a device, restarting a service, or execution of an automated script.

10. A system for dynamic incident management for a computer infrastructure including a plurality of end-user devices electronic devices located across a plurality of infrastructure locations, the system comprising at least one processor configured for:
  receiving, via a network interface, end-user experience data associated with the plurality of end-user devices, the end-user experience data collected at the respective end-user devices and including performance data associated with at least one application running on the respective end-user devices of the plurality of end-user devices;
  storing the end-user experience data for a corresponding end-user device in a first layer of an infrastructure database node corresponding to a location of the of the end-user device, the infrastructure database node configured to store end-user experience data for the plurality of end-user devices corresponding to the location;
  monitoring system performance data, the system performance data including at least one of: network performance data or server performance data;
  storing the system performance data associated with the location in a second layer of the infrastructure database node;
  upon determining that the end-user experience data for the corresponding end-user device indicates a latency issue at the end-user device, traversing the corresponding infrastructure database node to determine whether a threshold number of latency issues have occurred at the location within a defined time period;
  when the threshold number of latency issues have occurred at the location within the defined time period, mapping the latency issues to a system performance alert received within a mapping time threshold as a potential root cause, the system performance alert generated when the system performance data satisfies at least one condition indicative of a system performance issue; and
  triggering the execution of response instructions based on the potential root cause.

11. The system of claim 10 wherein the at least one processor is configured for: receiving end-user experience data indicative of a latency issue associated with an application identifier or an application activity identifier.

12. The system of claim 10 wherein the at least one processor is configured for: when a second set of latency issues are mapped to the same potential root cause, triggering the execution of response instructions for responding to a potential widespread system problem.

13. The system of claim 10 wherein the at least one processor is configured for: storing network performance data in the second layer, and storing server performance data in a third layer of the infrastructure database node.

14. The system of claim 10 wherein the at least one processor is configured for: monitoring each layer of the infrastructure database node for a trigger condition; and triggering the execution of response instructions when the trigger condition for at least one layer is satisfied.

15. The system of claim 10 wherein the at least one processor is configured for: upon mapping the latency issues to the potential root cause, traversing the end-user experience data of a second infrastructure database node for a similar mapping of latency issues at a second location; and upon detecting the similar mapping, generating a graph database edge between the infrastructure database node and the second infrastructure database node.

16. The system of claim 15 wherein the at least one processor is configured for: generating a location group data structure for the infrastructure database nodes connected by graph database edges; the location group data structure including: an application identifier or an application activity identifier, and a related potential root cause.

17. The system of claim 15 wherein the at least one processor is configured for: subsequent to the generation of the location group data structure, upon triggering the execution of response instructions based on the potential root cause of received end-user experience data or system performance data for a first connected infrastructure database node identified in the location group data structure, triggering the execution of response instructions for a second connected infrastructure database node identified in the location group data structure.

18. The system of claim 10 wherein the response instructions cause at least one of: generation of an alert or notification, clearing a cache, rebooting a device, restarting a service, or execution of an automated script.

19. A non-transitory computer-readable medium or media having stored thereon instructions which, when executed by at least one processor, configure the at least one processor for:
  receiving, via a network interface, end-user experience data associated with a plurality of end-user devices, the end-user experience data collected at the respective end-user devices and including performance data associated with at least one application running on the respective end-user devices of the plurality of end-user devices;
  storing the end-user experience data for a corresponding end-user device in a first layer of an infrastructure database node corresponding to a location of the of the end-user device, the infrastructure database node configured to store end-user experience data for the plurality of end-user devices corresponding to the location;
  monitoring system performance data, the system performance data including at least one of: network performance data or server performance data;
  storing the system performance data associated with the location in a second layer of the infrastructure database node;
  upon determining that the end-user experience data for the corresponding end-user device indicates a latency issue at the end-user device, traversing the corresponding infrastructure database node to determine whether a threshold number of latency issues have occurred at the location within a defined time period;
  when the threshold number of latency issues have occurred at the location within the defined time period, mapping the latency issues to a system performance alert received within a mapping time threshold as a potential root cause, the system performance alert generated when the system performance data satisfies at least one condition indicative of a system performance issue; and
triggering the execution of response instructions based on the potential root cause.

* * * * *